United States Patent [19]

Matsubara et al.

[11] Patent Number: 4,924,465
[45] Date of Patent: May 8, 1990

[54] MEMORY WITH FUNCTION TEST OF ERROR DETECTION/CORRECTION DEVICE

[75] Inventors: Toshiyuki Matsubara; Shuzo Fujioka; Atsuo Yamaguchi; Kenichi Takahira; Shigeru Furuta; Takesi Inoue, all of Itami, Japan

[73] Assignee: Mitsubishi Denki Kabushiki Kaisha, Japan

[21] Appl. No.: 260,021

[22] Filed: Oct. 20, 1988

[30] Foreign Application Priority Data

Jun. 30, 1988 [JP] Japan ................ 63-160744

[51] Int. Cl.$^5$ .............. G06F 11/10; G06F 11/00
[52] U.S. Cl. ........................... 371/3; 371/40.1
[58] Field of Search ............. 371/3, 38.1, 39.1, 40.1, 371/13

[56] References Cited

U.S. PATENT DOCUMENTS

| | | | |
|---|---|---|---|
| 4,034,195 | 7/1977 | Bates | 371/3 |
| 4,359,771 | 11/1982 | Johnson et al. | 371/13 |
| 4,561,095 | 12/1985 | Khan | 371/3 |
| 4,763,328 | 8/1988 | Shimoda et al. | 371/3 |
| 4,794,597 | 12/1988 | Ooba et al. | 371/3 |
| 4,809,273 | 2/1989 | Jackowski et al. | 371/3 |

FOREIGN PATENT DOCUMENTS 62-32822 7/1987 Japan .
62-32823 7/1987 Japan .
62-32825 7/1987 Japan .

OTHER PUBLICATIONS

Barsuhn et al., Self-Testing ECC Logic, IBM Tech. Discl. Bulletin, vol. 20, No. 7, Dec. 1977, pp. 2733-2734.

Primary Examiner—Charles E. Atkinson
Attorney, Agent, or Firm—Leydig, Voit & Mayer

[57] ABSTRACT

A memory device for detecting and correcting errors in stored data includes a circuit for generating an error-detection/correction code with respect to data to be stored, a memory cell array in which the data and the error-detection/correction code are stored, an error-detection/correction circuit for detecting and corrrecting errors in the data by using the error-detection/correction code when the data is read out of the memory cell array, and a function test circuit selectively and directly connected to the error-detection/correction circuit for testing the error-detection/correction circuit.

5 Claims, 2 Drawing Sheets

MEMORY WITH FUNCTION TEST OF ERROR DETECTION/CORRECTION DEVICE

BACKGROUND OF THE INVENTION

This invention relates to a memory device and, more particularly, to a function test for an error-detection/correction means provided in the memory device.

In a memory device, that is, specifically, an EEPROM, there is a possibility that data previously stored in a memory cell array may be affected and changed by writing or reading data into or from a memory area in the vicinity of that previously stored data. For this reason, the memory device is usually provided with a means for detecting and correcting errors in data stored in the memory device. For example, this means operates so that when data are written in a memory cell array, an error check code (hereinafter referred to as "ECC") is formed with respect to each data item. This error check code is written, together with the corresponding data item, into an assigned address in the memory cell array. If if the data is thereafter read out, detection and correction of errors in the data is performed with respect to each read data item by using the ECCs formed at the time of writing. Examples of this type of memory device are disclosed in Japanese Patent Publication Nos. 62-32822 and 62-32823. The system disclosed in Japanese Patent Publication No. 62-32823 detects and corrects data errors by storing 8-bit data with a 4-bit ECC attached. FIG. 2 is a block diagram in which the construction of a conventional memory device such as that disclosed in Japanese Patent Publication No. 62-32822 for detecting and correcting data errors is schematically illustrated. As shown in FIG. 2, a memory device 10 (e.g., an EEPROM) connected between data buses 21a and 21b is constituted by an internal ECC formation circuit 11, a memory cell array 12 and an error-detection/correction circuit 13. A processor (not shown) controls writing and reading operations. If, at the time of writing, data is supplied from the processor to the memory cell array 12 via the input-side data bus 12a and a data signal line D, the internal ECC formation circuit 11 forms an internal ECC for the data and stores this code in an assigned address of the memory cell array 12 via an ECC signal line E. At the time of reading, the data and the corresponding internal ECC are read from the assigned addresses of the memory cell array 12, and the error-detection/correction circuit 13 detects and corrects errors in the data using the internal ECC and thereafter supplies the data to the output-side data bus 21b. There are various methods of performing error checking in this system. For example, the error-detection/correction circuit 13 may calculate, at the time of reading, an ECC with respect to the read data in the same manner as in the case of ECC formation at the time of writing and compare this ECC with the internal ECC formed in the internal ECC formation circuit 11 at the time of writing. An error in the data may be detected from the comparison and thereafter corrected. This method is disclosed in Japanese Patent Publication No. 62-32825.

Conventionally, a function test for the errordetection/correction circuit 13 is usually performed in the following manner. As indicated by the broken line in FIG. 2, a change-over switch 14 and a register 15 for receiving and storing an ECC set from the outside (hereinafter referred to as "external ECC register") are provided, and the external ECC register 15 is selectively connected to the memory cell array 12. To perform a function test, the connected switch 14 is changed over to the external ECC register 15, and a desired external ECC for function testing, the content of which is known. The content of the external ECC is written into the register 15, for example, from the processor (not shown). At the same time, data for function testing, the content of which is known (e. g., all "0" data such as 00000000 if the data is 8-bit data), is input via the data signal line D. The ECC and the data thereby supplied are temporarily stored, in combination with each other, in the memory cell array 12. The data thereby stored are read out and tested to determine whether or not the read data is suitably corrected in the error-detection/correction circuit 13 on the basis of the external ECC before it is supplied to the output-side data bus 21b.

To perform the function test for the errordetection/correction circuit in the thus-constructed memory device, the data and an ECC set from the outside for function testing, the contents of which are known, must be temporarily stored in the memory cell array. For this reason, the test process is time-consuming and troublesome. There is also the problem that in a defect of the memory cell array can influence the test results since, in this test, the data and the ECC are temporarily stored in the memory cell array.

SUMMARY OF THE INVENTION

In view of these problems, it is an object of the present invention to provide a memory device capable of reducing the time taken to perform the function test for the error-detection/correction means as well as preventing any influence of memory cell array defects upon the test.

To this end, the present invention provides a memory device for detecting and correcting errors in stored data, the memory device having: a means for generating an error-detection/correction code with respect to data to be stored; a memory means for storing the data and the error-detection/correction code; an error-detection/correction means for detecting and correcting errors in the data by using the error-detection/correction code when the data is read out of the memory means; and a function test means selectively and directly connected to the error-detection/correction means for testing the error-detection/correction means by outputting from the error-detection/correction means an error-detection/correction code set from an error-detection/correction code set of known content input from outside the memory device and comparing the output code set with the input code set.

In the memory device in accordance with the present invention, the provision of the function test means selectively and directly connected to the error-detection/correction means and for performing the function test for the error-detection/correction means enables a desired error-detection/correction code to be directly input into the error-detection/correction means from the outside without being supplied by way of the memory cell array.

DESCRIPTION OF THE PREFERRED EMBODIMENT

Figure 1:
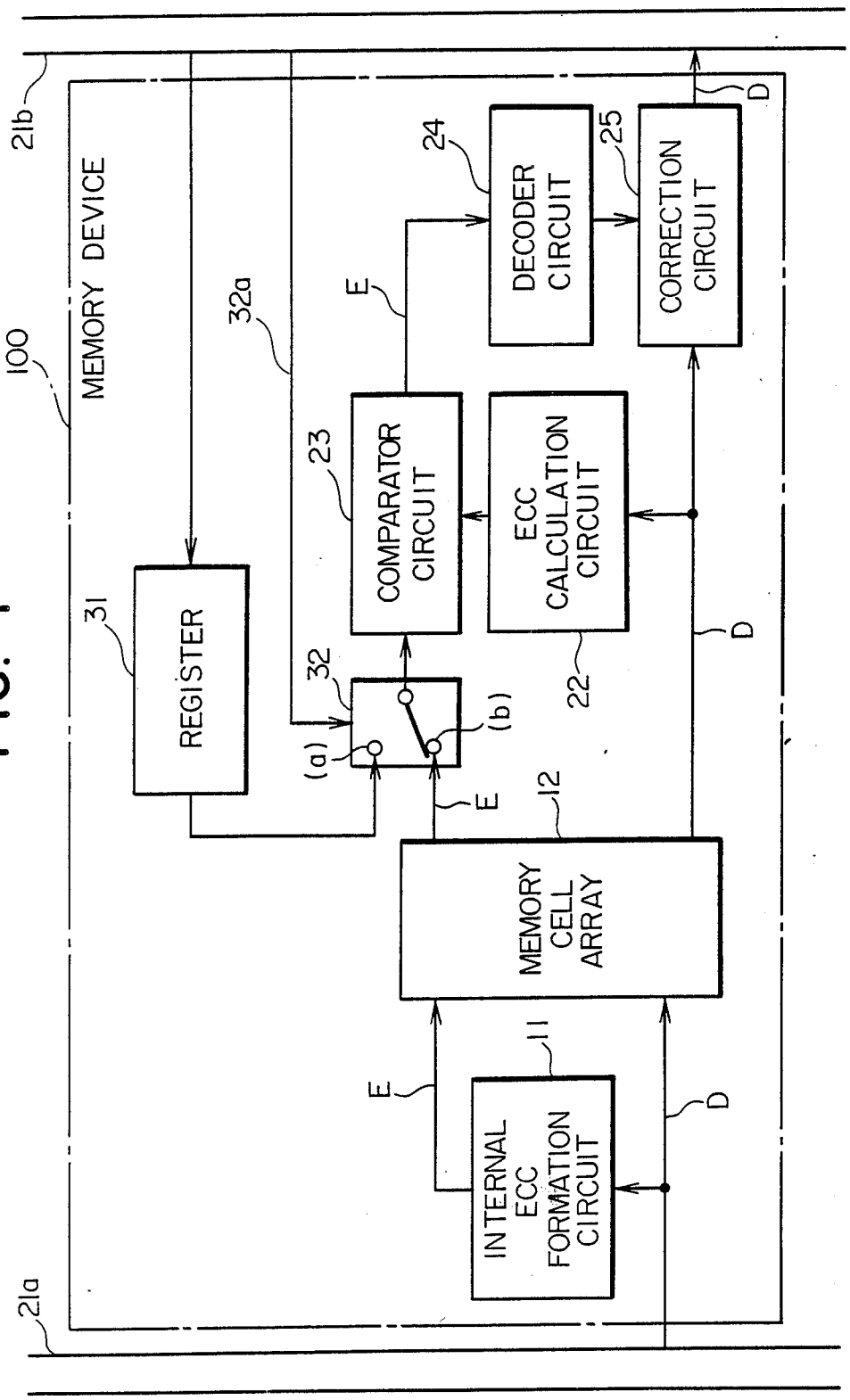
FIG. 1 is a block diagram of the construction of a memory device which represents an embodiment of the present invention.
Figure 2:
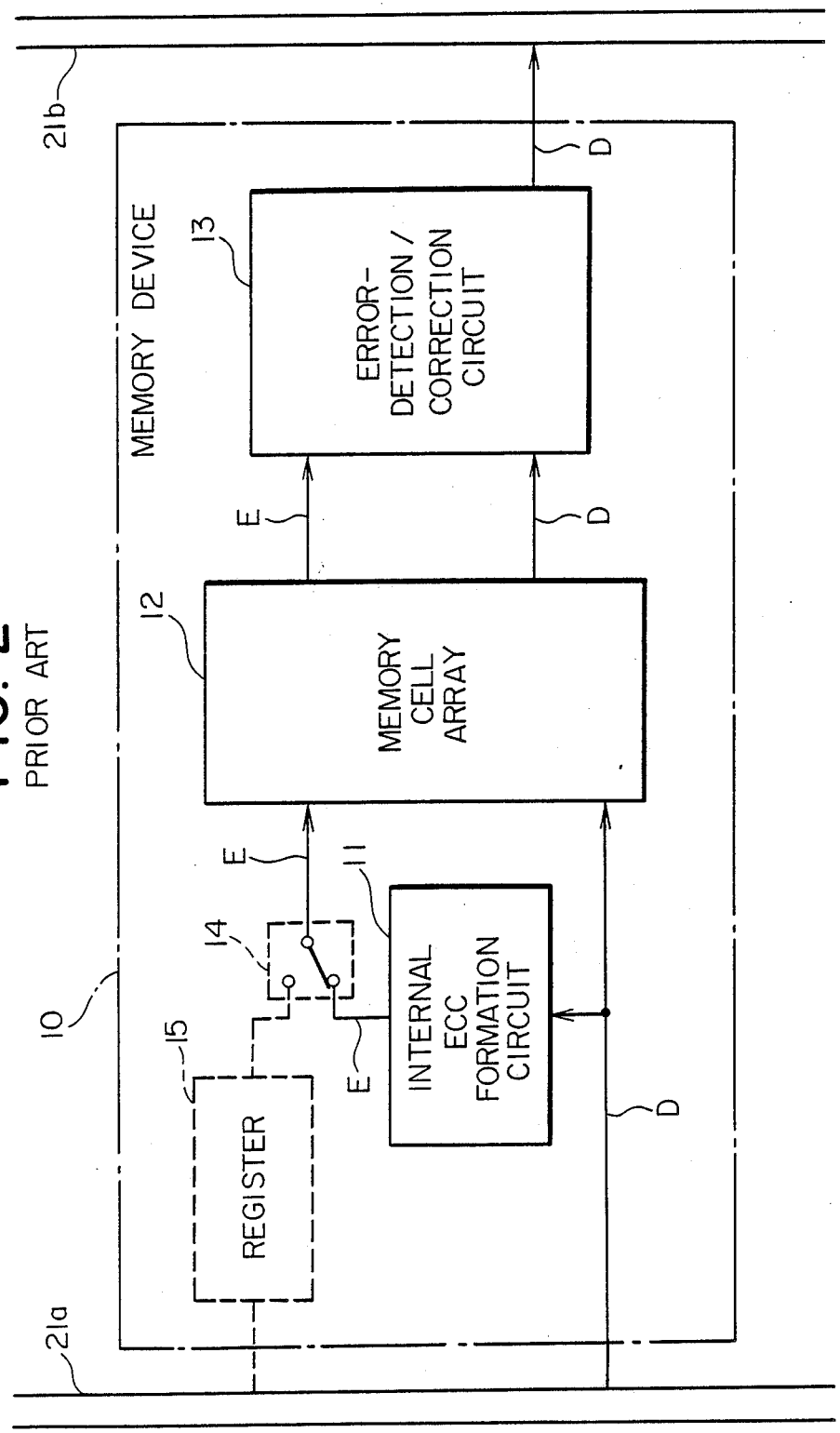
FIG. 2 is a block diagram of the construction of a conventional memory device.

An embodiment of the present invention will be described below with reference to the accompanying drawings. FIG. 1 is a block diagram of a memory device 100 which represents an embodiment of the present invention. The memory device 100 is provided between data buses 21a and 21b, and a writing or reading operation of the memory device is assigned by a processor (not shown) provided as an access means. The memory device 100 has: an error-detection/correction-code generating means constituted by an internal ECC formation circuit 11; a memory means constituted by a memory cell array 12; an error-detection/correction means constituted by an ECC calculation circuit 22, a comparator circuit 23, a decoder circuit 24, and a correction circuit 25; and a function test means including a register 31 for receiving and storing an ECC set from the outside (hereinafter referred to as "external ECC register") and a change-over switch 32 for testing the functions of the errordetection/correction means. The change-over switch 32 maintains its connection to a terminal b during an ordinary writing or reading operation, as shown in FIG. 1.

At the time of data writing, data are supplied from the processor to the memory cell array 12 via the input-side data bus 21a and a data signal line D. In response to data input, the internal ECC formation circuit 11 forms an internal ECC (error-detection/correction code) for the supplied data, and stores this code in an assigned address of a memory cell array 12 via an ECC signal line E. At the time of reading, the data and the corresponding internal ECC are read from the assigned addresses of the memory cell array 12, and the ECC calculation circuit 22 calculates an ECC from the data thereby read out in the same manner as the operation of the internal ECC formation circuit 11. Since the change-over switch 32 is connected to the terminal b, the comparator circuit 23 can compare the calculated ECC with the internal ECC read out of the memory cell array 12. If, as a result of this comparison, these codes coincide with each other, the data are output to the data bus 21b via the data signal line D and the correction circuit 25 without being processed by correction circuit 25. If, as a result of the comparison effected by the comparator circuit 23, the ECC calculated by the ECC calculation circuit 22 does not coincide with the internal ECC from the memory cell array 12, the internal ECC stored in the memory cell array 12 is decoded by the decoder circuit 24. The data read out of the memory cell array 12 is then corrected by the correction circuit 25 on the basis of the ECC thereby decoded and is thereafter output to the data bus 21b.

To function test the error-detection/correction means of the memory device 100, the change-over switch 32 is switched to the terminal a. The instruction to perform this change-over operation is sent from the processor (not shown) via the data bus 21b and the change-over signal line 32a. A desired ECC for function testing, the content of which is known, is received in the external ECC register 31 from outside of the memory device 100, for example, from the processor. At the same time, data for function testing, the content of which is known (e. g., all "0" data such as 00000000 if the data is 8-bit data), is stored in the memory cell array 12. The data thereby stored is read out and tested whether or not the read data is suitably corrected on the basis of the ECC for the function testing before it is supplied to the output-side data bus 21b of the memory device 100.

The present invention is applicable to memory devices for various kinds of use. For example, it can be applied to an EEPROM which is provided as a memory section of a microcomputer incorporated in an IC card.

The data signal line and the ECC signal line in the memory device may be serial signal lines for supplying 8-bit data and a 4-bit ECC or may be parallel signal lines suitable for supplying data and ECC items in parallel with each other.

In accordance with the present invention, as described above, the function test means for testing the error-detection/correction means is selectively and directly connected to the error-detection/correction means, thereby enabling a desired error-detection/correction code to be set in error-detection/correction means from the outside without being supplied by way of the memory cell array. It is thereby possible to reduce the time taken for the function test as well as to test the error-detection/correction means without any influence of defects of the memory cell array upon the results of the test.

What is claimed is:

1. A memory device for detecting and correcting errors in stored data comprising:
   means for generating a first error-detection/correction code with respect to data to be stored;
   memory means for storing said data and said first error-detection/correction code;
   error-detection/correction means for detecting and correcting errors in said data by using said first error-detection/correction code when said data is read out of said memory means; and
   function test means selectively and directly connectable to said error-detection/correction means for testing said error-detection/correction mean by outputting from said error-detection/correction means an error-detection/correction code set derived from an error-detection/correction code set of known content input from outside said memory device and comparing the output code set with the input code set.

2. A memory device according to claim 1 wherein said memory device is an EEPROM.

3. A memory device according to claim 1 wherein said memory device is a memory section incorporated in an IC card.

4. A memory device according to claim 3 wherein said memory device is an EEPROM.

5. A memory device according to claim 1 wherein said error-detection/correction means includes:
   calculator means receiving stored data from said memory means for calculating a second error-detection/correction code;
   comparator means receiving the second error-detection/correction code and one of the first error-detection/correction code and the error-detection/correction code set input from outside said memory deivce for comparing the received codes to each other and generating a decode signal when the received codes do not coincide;
   decoder means receiving the output of said comparator means for adapting the first error-detection/correction code in response to a decode signal to produce a decoded first error-detection/correction signal; and
   correction means receiving the stored data from said memory means and the decoded first error-detection/correction signal for correcting the stored data.

* * * * *

UNITED STATES PATENT AND TRADEMARK OFFICE
CERTIFICATE OF CORRECTION

PATENT NO. : 4,924,465
DATED : May 8, 1990
INVENTOR(S) : Matsubara et al

It is certified that error appears in the above-identified patent and that said Letters Patent is hereby corrected as shown below:

Column 4, line 57, change "deivce" to --device--;

Column 4, line 61, change "adapting" to --decoding--.

Signed and Sealed this

Twenty-seventh Day of August, 1991

Attest:

HARRY F. MANBECK, JR.

Attesting Officer

Commissioner of Patents and Trademarks